UNITED STATES PATENT OFFICE.

GEORGE E. DYCK, OF CHICAGO, ILLINOIS.

STOCK FOOD AND PROCESS OF MAKING SAME.

1,071,218.     Specification of Letters Patent.     Patented Aug. 26, 1913.

No Drawing.     Application filed July 17, 1912. Serial No. 709,919.

*To all whom it may concern:*

Be it known that I, GEORGE E. DYCK, a citizen of the United States, residing at Chicago, in the county of Cook and State of Illinois, have invented a certain new and useful Improvement in Stock Food and Processes of Making Same, of which the following is a full, clear, concise, and exact description, reference being had to the accompanying drawings, forming a part of this specification.

My invention relates to the preparation of a food for stock, cattle and so on, and its object is to afford a simple, practical and effective process for preparing or manufacturing such a stock food from materials that would otherwise be thrown away, especially such material, for example, as the paunch contents of slaughtered cattle. In carrying out my invention I take such paunch contents as the same may be available in packing houses or in other ways, and subject it to treatment, the result of which is the formation of a product which is especially acceptable for cattle and the like, being not only a good food, but sanitary and medicinal as well. In carrying out this process, the paunch contents are put into tanks as a convenient arrangement for their treatment, and are subjected to high, open steam pressure of one hundred pounds, more or less, to the square inch. This is done for about half an hour. Then hydrochloric acid, or any other acid, is admitted to the tank, and the pressure then continued for another half hour, at the end of which the steam is blown off. A neutralizing agent, such for example as caustic soda or other alkali, is then admitted to the tank to neutralize the hydrochloric acid. The whole is then dry or dried. The result is the formation of a stock food containing considerable saccharine matter, which food is produced from matter which is otherwise useless and is thrown away. Where hydrochloric acid and caustic soda are used, any excess of the same over and above that necessary for carrying on the process is converted into sodium chlorid, which is, of course, common salt. This is a very acceptable and wholesome ingredient of the food, making it all the more palatable for the cattle. Instead of introducing the acid first, the caustic soda or other alkali can be introduced first, and then the acid introduced later on.

It will be understood that changes and modification can be made without departing from the spirit of the invention.

What I claim is:

1. The herein described process consisting in subjecting the paunch contents of cattle to steam under high pressure and then treating the same with a suitable acid and with a suitable alkali to neutralize said acid.

2. The herein described process which consists in subjecting the paunch contents of cattle to steam under high pressure and subjecting the same to the action of hydrochloric acid and then adding caustic soda.

3. The herein described process which consists in subjecting the paunch contents of cattle to the action of steam under pressure of approximately one hundred pounds, more or less, to the square inch for about half an hour, then admitting hydrochloric acid, and then continuing the pressure for another half hour, then blowing off the steam, and then neutralizing the remaining acid with caustic soda.

4. A food product consisting of the paunch contents of cattle combined with a suitable salt to form an edible food product.

In witness whereof, I hereunto subscribe my name this 3rd day of July, A. D. 1912.

GEORGE E. DYCK.

Witnesses:
    A. L. JONES,
    A. S. DENNISON.